US005111317A

United States Patent [19]

[11] Patent Number: 5,111,317

[45] Date of Patent: May 5, 1992

Coulson

[54] METHOD OF DRIVING A FERROELECTRIC LIQUID CRYSTAL SHUTTER HAVING THE APPLICATION OF A PLURALITY OF CONTROLLING PULSES FOR COUNTERACTING RELAXATION

[75] Inventor: Ian Coulson, Maidenhead, England

[73] Assignee: Thorn Emi plc, London, England

[21] Appl. No.: 444,424

[22] Filed: Dec. 1, 1989

[30] Foreign Application Priority Data

Dec. 14, 1988 [GB] United Kingdom ................ 8829129
Jun. 28, 1989 [GB] United Kingdom ................ 8914836

[51] Int. Cl.[5] ................................ G02F 1/133
[52] U.S. Cl. ........................ 359/56; 340/805
[58] Field of Search .................. 350/332, 333, 350 S; 340/784, 805

[56] References Cited

U.S. PATENT DOCUMENTS

| | | | |
|---|---|---|---|
| 4,508,429 | 4/1985 | Nagae et al. | 350/350 S |
| 4,591,886 | 5/1986 | Umeda et al. | 350/350 S |
| 4,701,026 | 10/1987 | Yazaki et al. | 350/350 S |
| 4,705,345 | 11/1987 | Ayliffe et al. | 350/333 |
| 4,725,129 | 2/1988 | Kondo et al. | 350/333 |
| 4,770,502 | 9/1988 | Kitazima et al. | 350/333 |
| 4,834,510 | 5/1989 | Fujita | 350/350 S |
| 4,859,035 | 8/1989 | Ichinose et al. | 350/333 |
| 4,904,064 | 2/1990 | Lagerwall et al. | 350/350 S |

FOREIGN PATENT DOCUMENTS

| | | |
|---|---|---|
| 171177 | 2/1986 | European Pat. Off. . |
| 2175725 | 12/1986 | United Kingdom . |

OTHER PUBLICATIONS

Japanese Journal of Applied Physics, vol. 27, No. 7, Jul. 1988, pp. 1115-1121, "Influences of Alignment Materials and LC Layer Thickness on AC Field—Stabilization of Phenomena of Ferroelectric Liquid Crystals", by T. Umeda et al.

Japanese Journal of Applied Physics, vol. 27, No. 7, Jul. 1988, pp. 1122-1125, "Physical Properties of Ferroelectric Liquid Crystals and AC Stabilization Effect", by T. Nagata et al.

J. S. Patel—"Room Temperature Switching Behavior of FLCD in Thin Cells", *Appl. Phys. Letter*—vol. 47—No. 12—Dec. 1985—pp. 1277-1279.

*Primary Examiner*—Stanley D. Miller
*Assistant Examiner*—Tai V. Duong
*Attorney, Agent, or Firm*—Fleit, Jacobson, Cohn, Price, Holman & Stern

[57] ABSTRACT

A ferroelectric liquid crystal device has a first state ($T_{X1}$) of maximum transmission, a second state ($T_{X2}$) of minimum transmission and a value of voltage pulse width ($t_S$) and voltage pulse height ($V_S$) sufficient for a switching pulse to switch the cell from the first state ($T_{X1}$) to the second state ($T_{X2}$) or vice versa. A method of controlling the transmission of electromagnetic radiation through the ferroelectric liquid crystal device comprises the step of applying, for a time period greater than said value of pulse width ($t_S$), a plurality of consecutive controlling pulses of one polarity. Each controlling pulse is itself of insufficient pulse height and pulse width to switch the cell from the first state ($T_{X1}$) to the second state ($T_{X2}$) or vice versa.

9 Claims, 6 Drawing Sheets

METHOD OF DRIVING A FERROELECTRIC LIQUID CRYSTAL SHUTTER HAVING THE APPLICATION OF A PLURALITY OF CONTROLLING PULSES FOR COUNTERACTING RELAXATION

BACKGROUND OF THE INVENTION

This invention relates to a method of addressing a ferroelectric liquid crystal device (FLCD), in particular to a method of controlling the transmission of electromagnetic radiation through such a device. This method is particularly, though not exclusively, intended for addressing such a device used as an optical shutter. It is envisaged that such a method could be used to control the transmission through a FLCD of electromagnetic radiation of other wavelengths e.g. infra-red and ultraviolet radiation as well as optical radiation.

Ferroelectric liquid crystal materials have a DC voltage response. An FLCD containing such a material between polarizers can be switched from a light transmissive state to a non-transmissive state and vice versa by an applied voltage of sufficient magnitude and pulse width, the state into which it is switched being dependent upon the polarity of the applied voltage. A variety of voltage waveforms can be used but a waveform with a step function, e.g. a square wave pulse, is preferred for a minimum rise and fall time (fast response). FIG. 1 shows an electro-optic characteristic, i.e. a plot of pulse height $V_S$ against pulse width $t_S$ of a monopolar pulse wave (see inset - FIG. 1) to produce switching from a light transmissive state to a non-transmissive state or vice versa for a layer of a typical ferroelectric liquid crystal material, such as SCE13 (supplied by BDH Ltd., Poole, UK). The layer was 1.5 μm thick and the temperature was 25° C.

FIG. 2 shows a graph of voltage applied to a ferroelectric liquid crystal layer against time and a graph of optical transmission of that liquid crystal layer over the same time. Monopolar pulses of sufficient pulse height $V_S$ and pulse width $t_S$ to switch the liquid crystal layer between a first state $T_{X1}$ of maximum optical transmission and a second state $T_{X2}$ of minimum optical transmission are applied. The ideal optical transmission curve is shown in dotted lines - the liquid crystal is latched in the first or second state until a pulse of the polarity required to switch it into the other state is applied. However, in a practical embodiment some relaxation of the latched states usually occurs within a period of $10t_S$ and the separation of the monopolar pulses is greater than this. The continuous curve of FIG. 2 shows this relaxation which reduces the contrast ratio, an undesirable effect for a light shutter.

A variety of addressing schemes have been tried to avoid the problem of relaxation. In one scheme, as shown in FIG. 3, the device is switched between the first and second states $T_{X1}$, $T_{X2}$ by a continuously applied AC square wave voltage. The AC square wave voltage pulses are of sufficient height $V_S$ and pulse width $t_S$ to switch between the first and second states. The applied voltage $V_s$ prevents relaxation occurring and maintains the liquid crystal cell in the $T_{x1}$ or $T_{x2}$ state, ensuring that the contrast remains high. However the alignment of the liquid crystal layer in the device can easily be damaged in an irreversible manner when alternating electric fields above a critical value are applied. Alignment damage to the liquid crystal layer reduces the contrast ratio of the shutter and tends to increase the response time of the material. For many materials, the critical value is typically of the order of 10V/ μm - well below that usually required to realize the maximum switching speed.

In an alternative scheme, as shown in FIG. 4, as high frequency background AC signal of voltage magnitude $V_{AC}$ is applied to stabilize the states $T_{X1}$ and $T_{X2}$. When $V_{AC}$ has a finite value $V_a$, there is stabilization whereas when $V_{AC}$ 32 0, relaxation occurs. Unfortunately the value of the fields necessary for AC stabilization can depend on a variety of parameters such as cell thickness, preparation of the alignment layer material and physical properties of the liquid crystal material, such as its dielectric anisotropy e.g. as disclosed by T.Umeda et al : Influences of Alignment Materials and LC Layer Thickness on AC Field - Stabilization Phenomena of Ferroelectric Liquid Crystals (Japanese Journal of Applied Physics Vol. 27. No. 7. Jul. 1988, pages 1115–1121) and T. Nagata et al : Physical Properties of Ferroelectric Liquid Crystals and AC Stabilization Effect (Japanese Journal of Applied Physics Vol. 27. No. 7. Jul. 1988, pages 1122–1125). With many liquid crystal materials, AC stabilization is not very successful. Often large AC fields are required which are about or greater than the critical value which will produce alignment damage to the liquid crystal layer and reduce the contrast ratio.

GB 2175725A (Seikosha) discloses a method of driving an electro-optical display device (such as an FLCD) for producing a display consisting of display elements and which comprises first and second sets of electrodes, the electrodes of one set crossing those of the other. A selection signal is sequentially applied to the first set of electrodes while a non-selection signal is applied to each of the first set of electrodes to which the selection signal is not applied. In the methods described, defining a display element, the resultant waveform across that display element is a substantially true pulsed AC waveform. In two embodiments, this substantially having a reduced duration half or less than half of the duration of the switching pulse followed by two pulses of the same reduced duration but of the other polarity. The provision of a substantially time pulsed AC waveform ensures that the substantially transparent electrodes do not become blackened, the liquid crystal material does not deteriorate and double colour pigment does not become discoloured, even after driving for a long time. The AC waveform provided during non-selection also provides good contrast.

US 4508429 (Nagae et al) discloses a FLC display in which two light transmitting states, i.e. a bright state and a dark state, can be established. Each of these states is defined by the average brightness brought about by pulse voltage trains of a respective polarity. Each pulse in the pulse voltage trains shown is of the same pulse height which is accordingly sufficient to switch the FLC display from one defined light transmitting state to the other and vice versa. However, a problem with this driving method is that, unless the duration of the bright display state is equal to that of the dark display state, the voltage $V_{LC}$ applied to the FLC will include a DC component. US 4508429 discloses that 'It is well known that when a DC component is applied to a liquid crystal element during the driving thereof, the deterioration of the element is accelerated because of an electrochemical reaction, thereby resulting in a reduced life.'

SUMMARY OF THE INVENTION

It is an object of the present invention to provide an improved method of addressing a ferroelectric liquid crystal device.

According to the present invention there is provided a method of controlling the transmission of electromagnetic radiation through a ferroelectric liquid crystal device having a first state of maximum transmission, a second state of minimum transmission and a value of voltage pulse width and voltage pulse height sufficient for a switching pulse to switch the cell from said first state to said second state, the method comprising the step of applying, for a time period greater than said value of voltage pulse width, a plurality of consecutive controlling pulses of one polarity of control the transmission of the cell wherein each controlling pulse is of insufficient pulse height and pulse width to switch the cell from said first state to said second state or vice versa.

For the avoidance of doubt, it is hereby stated that the term 'pulse' as used hereinafter is in the sense of a non-zero voltage excursion which need not have a constant voltage magnitude but is of one polarity.

A scheme according to the present invention permits quasi-analogue control of the transmission of electromagnetic radiation through a ferroelectric liquid crystal device. In particular, it is possible to use high frequency pulses of a magnitude less than that which would cause alignment damage.

Preferably the method further comprises the step of applying a switching pulse of sufficient pulse height and pulse width to switch the device from said first state to said second state or vice versa. In this way, the switching pulse can be used to switch at high speed in a digital fashion between the first and second states while the controlling pulses can be used to control the transmission of electromagnetic radiation through the device once it is in the first or second state.

In an advantageous embodiment, the step of applying said switching pulse is followed by the step of applying a plurality of consecutive controlling pulses of the same polarity as said switching pulse whereby the cell is maintained in one of said first or said second states. A cell addressed by such a method has a high contrast ratio and the quick response produced by the switching pulse.

An optical shutter may be driven by an addressing scheme in which the steps of applying a switching pulse of one polarity and a plurality of consecutive controlling pulses of the same polarity as said switching pulse is followed by the steps of applying a switching pulse of the other polarity and a plurality of consecutive controlling pulses of that other polarity. The period for which pulses of one polarity are applied may be equal to the period for which pulses of the other polarity are applied, resulting in the optical shutter being the states of maximum and minimum transmission for equal periods of time and in a DC compensated waveform.

Alternatively, the optical shutter may be driven by an addressing scheme in which the period for which pulses of one polarity are applied is not equal to the period for which pulses of the other polarity are applied and so the optical shutter is in the states of maximum and minimum transmission for unequal periods of time. The inventor has surprisingly found that the present invention can provide an addressing scheme in which the problems of degradation of alignment due to DC electrolytic effects can be alleviated without the need to ensure that the waveform is DC compensated overall.

BRIEF DESCRIPTION OF THE DRAWINGS

Embodiments of the present invention will now be described, by way of example only, and with reference to the accompanying drawings of which.

DETAILED DESCRIPTION OF THE PREFERRED EMBODIMENTS

Figure 5:
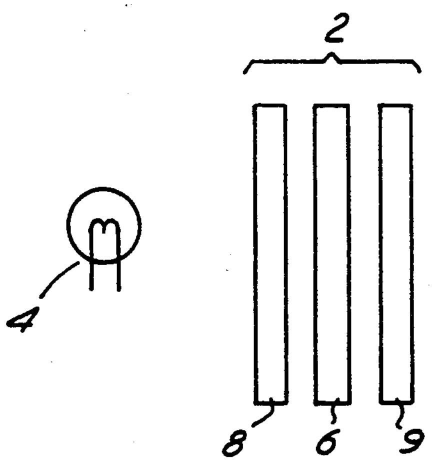
FIG. 5 is a schematic representation of an optical shutter including a ferroelectric liquid crystal cell.

FIG. 5 shows an optical shutter 2 in front of a light source shown schematically at 4. The optical shutter 2 is shown in an exploded view and comprises a ferroelectric liquid crystal cell 6 on either side of which is a polarizer 8, 9. The polarizers are usually crossed. The shutter 2 has a first state $T_{X1}$ of maximum optical transmission and a second state $T_{X2}$ of minimum optical transmission. Application of a voltage pulse of sufficient pulse height $V_S$ pulse width $t_S$ and of the correct polarity switches the shutter 2 from the first state to the second state or vice versa.

Figure 6:
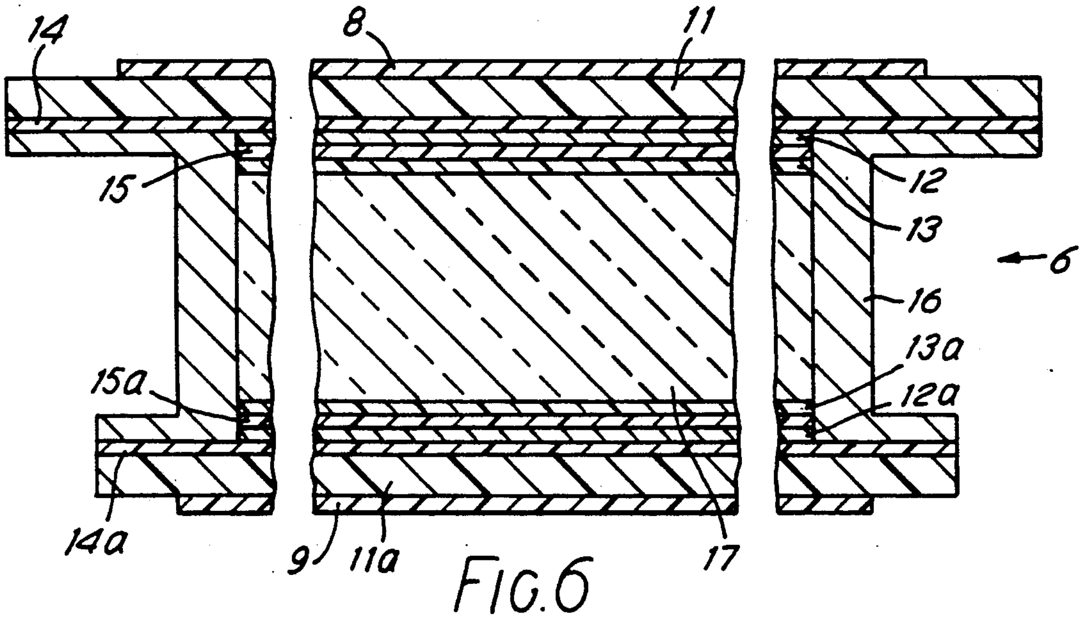
FIG. 6 is a cross-section of the ferroelectric liquid crystal cell of FIG. 5.

FIG. 6 shows the ferroelectric liquid crystal cell 6 of FIG. 5 in greater detail. The cell 6 consists of two glass plates 11, 11*a* each coated with a transparent conducting electrode 12, 12*a* formed of indium tin oxide and an alignment layer 13, 13*a*, typically of nylon or polyimide, rubbed unidirectionally. Insulating layers 14, 14*a*, and 15, 14*a* can be used respectively to separate the glass substrate 11, 11*a* from the electrode 12, 12*a* and the electrode 12, 12*a* from the alignment layer 13, 13*a*. The two glass plates 11, 11*a* are spaced 1.5 μm apart and are sealed around the perimeter with an adhesive edge seal 16 which holds the glass plates together. The indium tin oxide is patterned to define a single active element which can be directly driven by an applied voltage. A ferroelectric liquid crystal material 17, such as SCE13

(supplied by BDH Ltd., Poole, UK) is sandwiched between the two glass plates 11, 11*a*.

Figure 7:
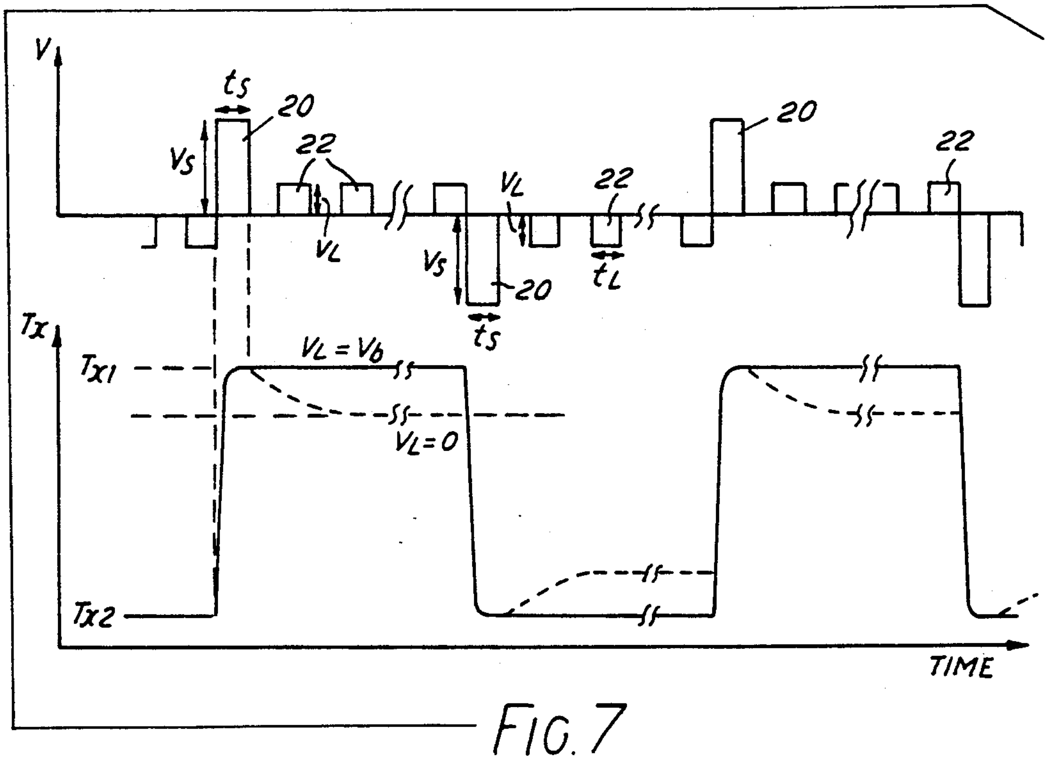
FIGS. 7 and 8 each show a graph of voltage applied to the shutter of FIG. 5 against time and a graph of optical transmission of that shutter over the same time for addressing schemes provided in accordance with the present invention.

FIG. 7 shows an addressing scheme provided in accordance with the present invention which can be used to address the shutter of FIG. 5 and maintain a high contrast ratio. The scheme is a waveform comprising single high voltage switching pulses 20 followed by a series of consecutive low voltage pulses 22 of the same polarity and a separation and pulse width typically the same as the pulse width of the switching pulse 20. The switching pulses have a pulse height $V_S$ and a pulse width $t_S$ such that the shutter can be switched from the first state to the second state or vice versa in the minimum time possible. Once the shutter has been switched into the first or the second state, in the absence of any applied voltage it would tend to relax as mentioned hereinbefore. The low voltage pulses 22 control the optical transmission of the shutter by continually before any significant relaxation can occur and so are effective as latching pulses. These low voltage pulses 22 each have a pulse height $V_L = V_b$ and a pulse width $t_L$ which individually are insufficient to switch the shutter from the first state to the second state or vice versa. As the latching pulses 22 prevent or at least reduce any relaxation of the first and second states, they ensure that the contrast ratio of the shutter remains as high as possible.

Because the ferroelectric liquid crystal has a DC response, the use of discrete latching pulses 22 can result in optical noise (i.e. the optical transmission $T_X$ will try to follow the instantaneous value of the applied voltage). This problem can be alleviated by keeping the pulse height-pulse width product for each latching pulse 22 to a minimum.

The use of a plurality of low voltage latching pulses of one polarity can cause DC electrolytic effects within the liquid crystal material, which can lead to alignment damage to the liquid crystal layer. Such effects can be reduced by using latching pulses of pulse-widths similar to or smaller than the pulse width $t_S$ of the switching pulse. It is believed that this improvement is due to the use of pulses of low pulse width, reducing the time during which charge can accumulate at the surfaces of the liquid crystal layer and allowing time between pulses for any accumulated charge to disperse before any irreversible distortion occurs in the alignment of the liquid crystal layer.

The pulse height used for the latching pulses is chosen to minimize the relaxation process without degradation of the alignment due to AC fields or any DC electrolytic effects. For some liquid crystal mixtures, if the pulse heights and pulse widths are carefully chosen, sequences of latching pulses of the same polarity lasting a few seconds can be achieved without causing DC alignment damage.

In one example, a shutter comprising a 1.5 μm thick cell containing the liquid crystal material SCE13 (supplied by BDH Ltd., Poole, UK) was operated at a temperature of 25° C. and a frequency of switching of 0.5Hz. The switching pulses were of pulse height 50V and pulse width about 15 μs. The latching pulses were of pulse height 5V with a pulse width and separation of about 15 μs.

Figure 8:
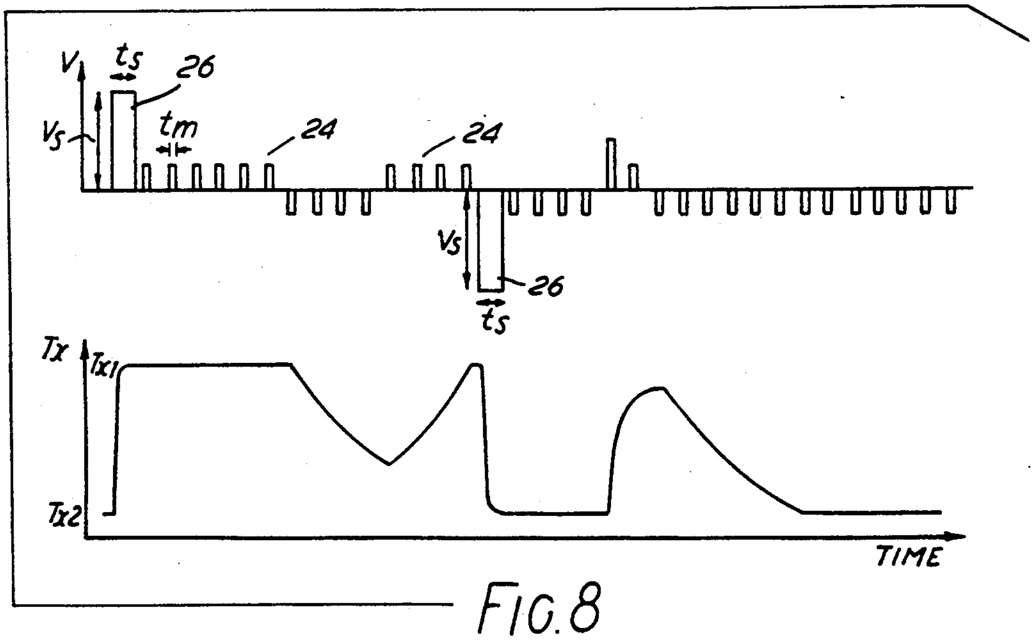

FIG. 8 illustrates the use of controlling pulses 24 in waveforms to control the optical transmission of the shutter. Switching pulses 26 of pulse height $V_S$ and pulse width $t_S$ can be used to switch the shutter from the state $T_{X1}$ to the state $T_{X2}$ and vice versa in the minimum time possible. Pulses of varying heights can be used to control the rate of change of optical transmission though it is envisaged that there is a minimum pulse height for a pulse below which the effect is negligible. Pulses of different polarities can be used to increase and decrease the optical transmission.

Figure 1:
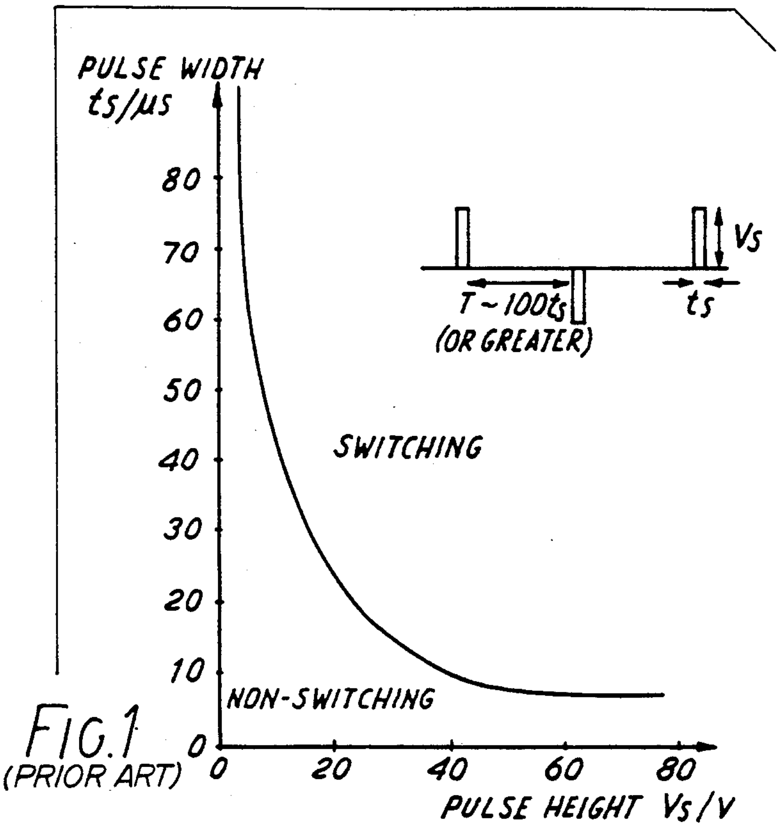
FIG. 1 (PRIOR ART)
FIG. 1 shows a typical electro-optic characteristic for a ferroelectric liquid crystal material.
Figure 2:
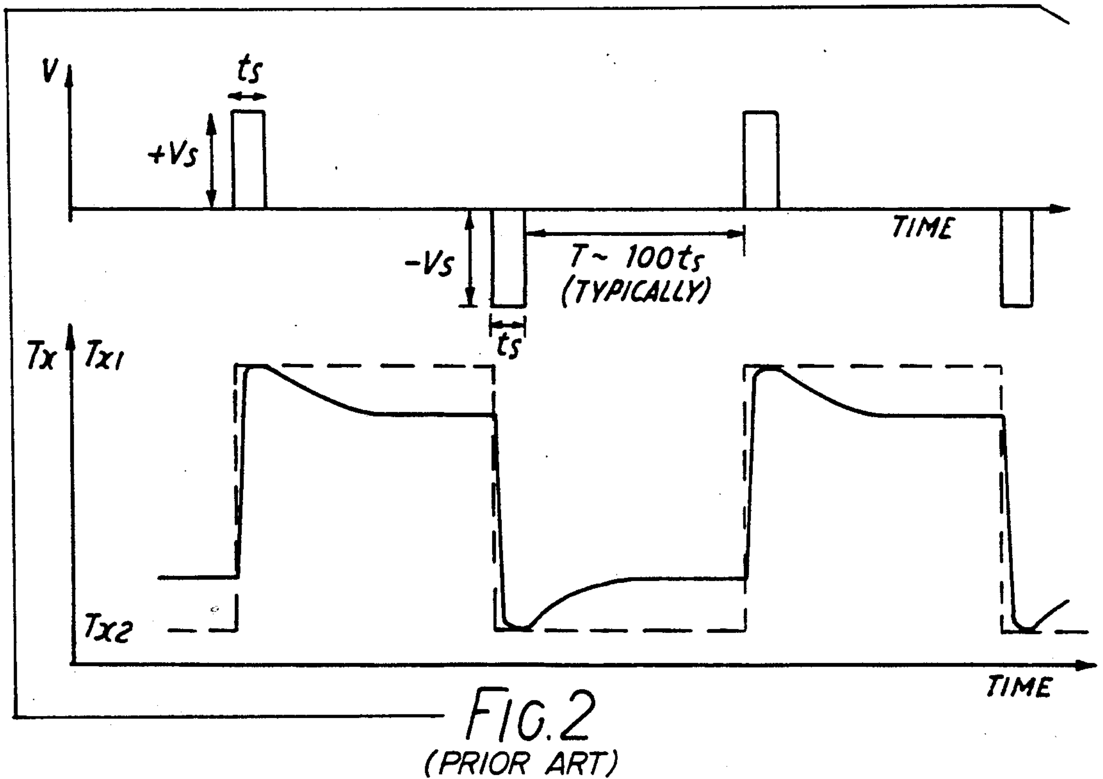
FIG. 2 (PRIOR ART)
FIGS. 2, 3 and 4 each show a graph of voltage applied to a ferroelectric liquid crystal layer against time and a graph of optical transmission of that liquid crystal layer over the same time for known addressing schemes.
Figure 3:
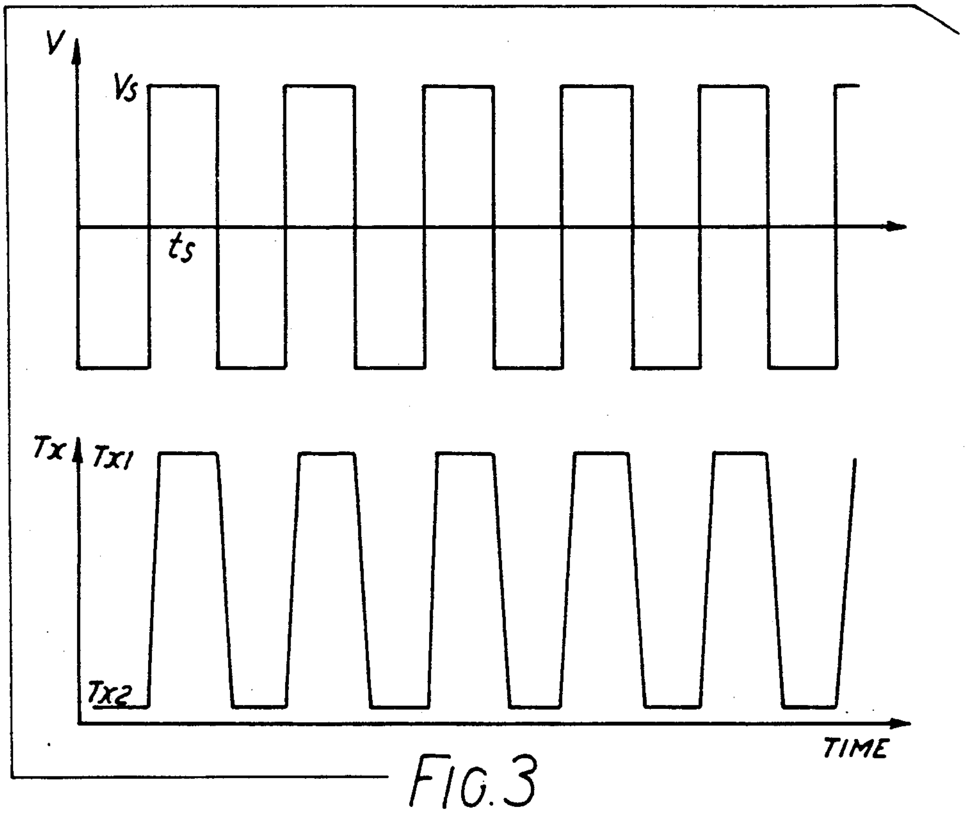
FIG. 3 (PRIOR ART)
Figure 4:
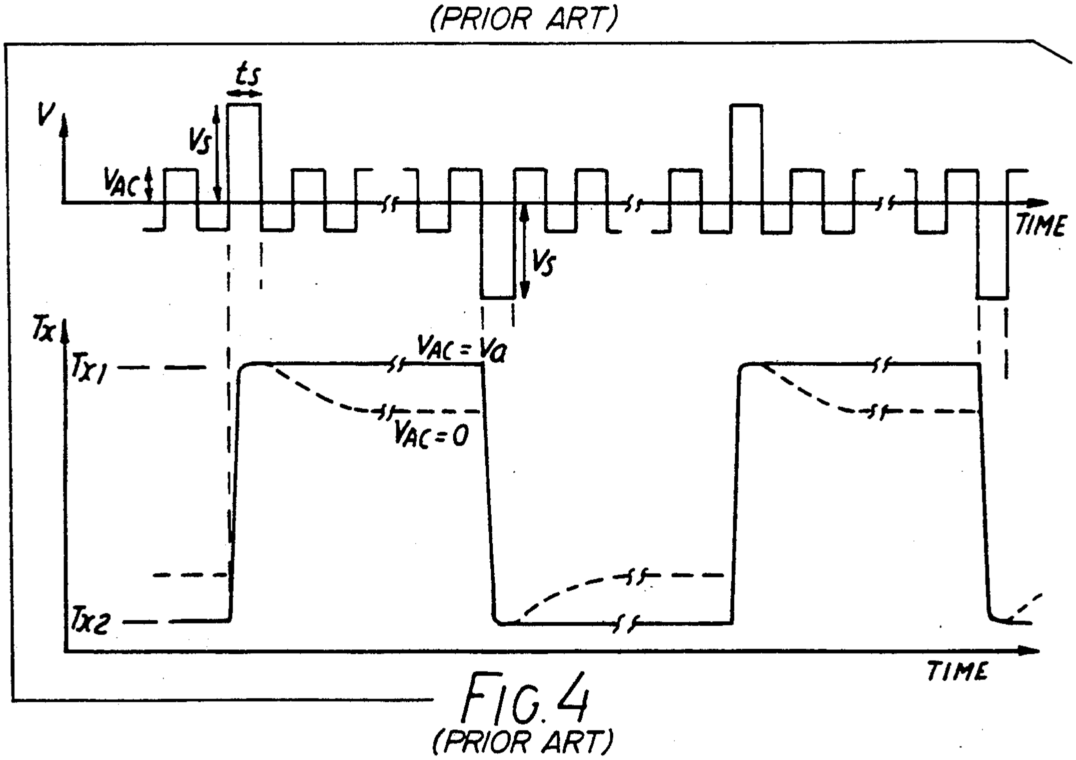
FIG. 4 (PRIOR ART)

The pulses heights and pulse widths should be chosen to avoid or at least alleviate potential alignment damage to the liquid crystal layer by DC or AC effects. For example, the controlling pulse magnitude should be kept below the critical value for AC damage, typically about 10V/ μm, though a few isolated controlling pulses can be similar in pulse height magnitude to that of the switching pulse. In particular, sequences of pulses of alternating polarity with a pulse height magnitude greater than the critical value should be kept to a minimum as this can cause AC alignment damage effects. The pulse width of the controlling pulses should be kept similar or smaller than the pulse width $t_S$ of the switching pulse, as defined by the electro-optic characteristic of the liquid crystal material, e.g. as shown in FIG. 1. The risk of DC electrolytic damage to the alignment increases as the pulse width increases to, e.g., a value of several $t_S$. It should also be noted that with some materials having a fast switching response, a reverse polarity pulse could switch the device completely from one state to the other when this is not required.

Figure 9:
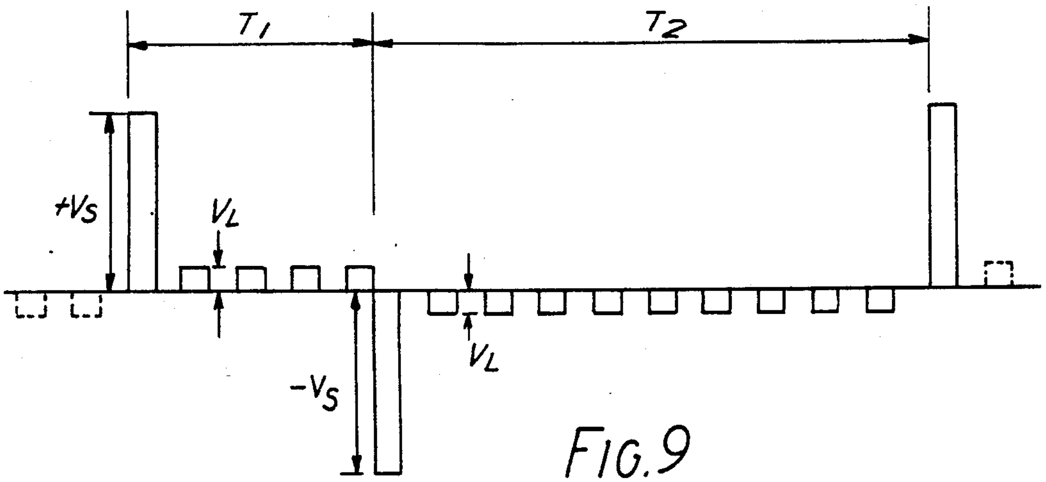
FIG. 9 shows a graph of voltage applied to the shutter of FIG. 5 against time for a further addressing scheme provided in accordance with the present invention.
Figure 10:
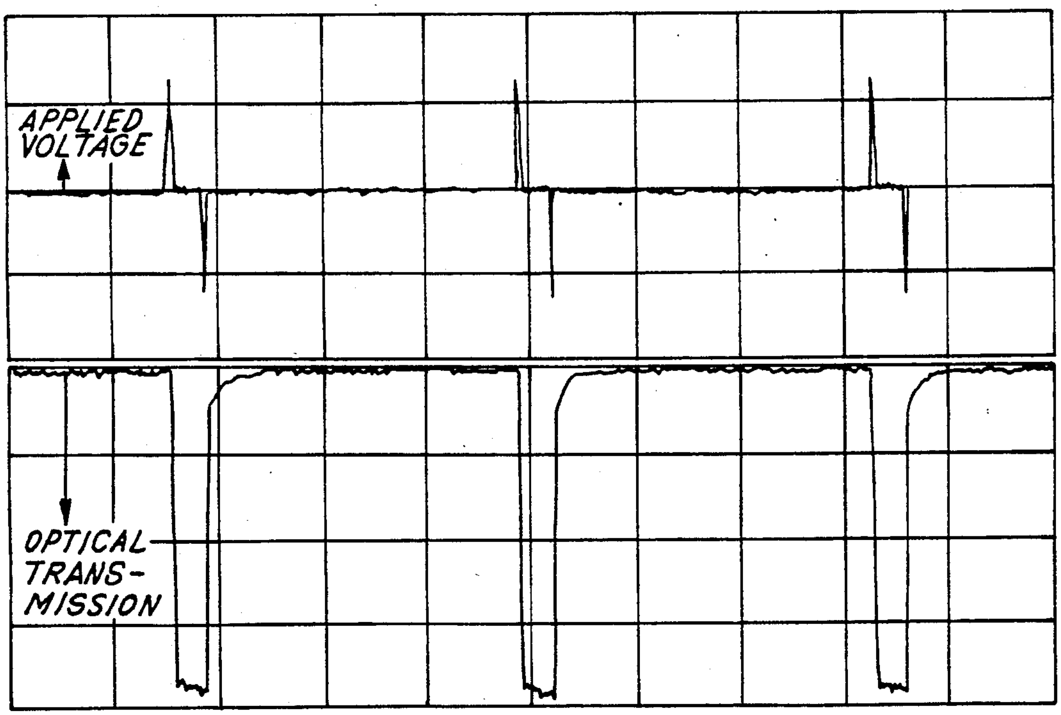
FIG. 10 shows a graph of optical transmission of the shutter of FIG. 5 over time for an addressing scheme similar to that shown in FIG. 9.

For most ferroelectric liquid crystal addressing schemes (either multiplexing or direct-drive) it is usual to arrange for the pulse sequence over the full driving cycle to be DC compensated i.e the sum of the pulse height pulse width product for the positive polarity pulses equals that of the negative polarity pulses. However, the inventor has surprisingly found that providing the appropriate measures described previously are taken to prevent degradation of alignment due to AC fields and DC electrolytic effects, it is possible to drive the device with an asymmetric waveform such as shown in FIG. 9, in which pulses of one polarity are applied for a period of $T_1$ and then pulses of the other polarity are applied for a period $T_2$ $T_1 \neq T_2$), resulting in asymmetric optical shutter transmission, i.e. an optical response with a mark-to-space ratio of $T_1$ to $T_2$. FIG. 10 shows an optical response for a shutter addressed by the scheme of FIG. 9 in which the mark-to-space ratio is 10:1. Using the same example and driving conditions as described previously - 1.5 μm thick cell containing liquid crystal material SCE13 at 25° C. etc —mark-to-space ratios up to 10:1 (or the inverse 1:10) can be achieved with no cell alignment degradation.

Figure 11A:
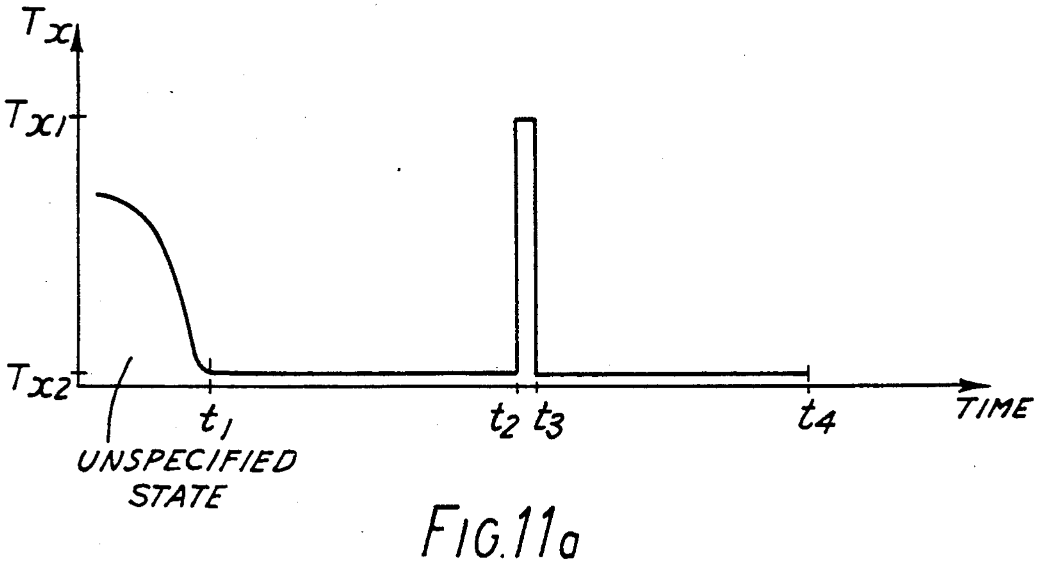
FIGS. 11*a* and 11*b* show respectively a graph of optical transmission over time for a shutter used in a camera system and a graph of voltage applied to the shutter in an addressing scheme provided in accordance with the present invention.
Figure 11B:
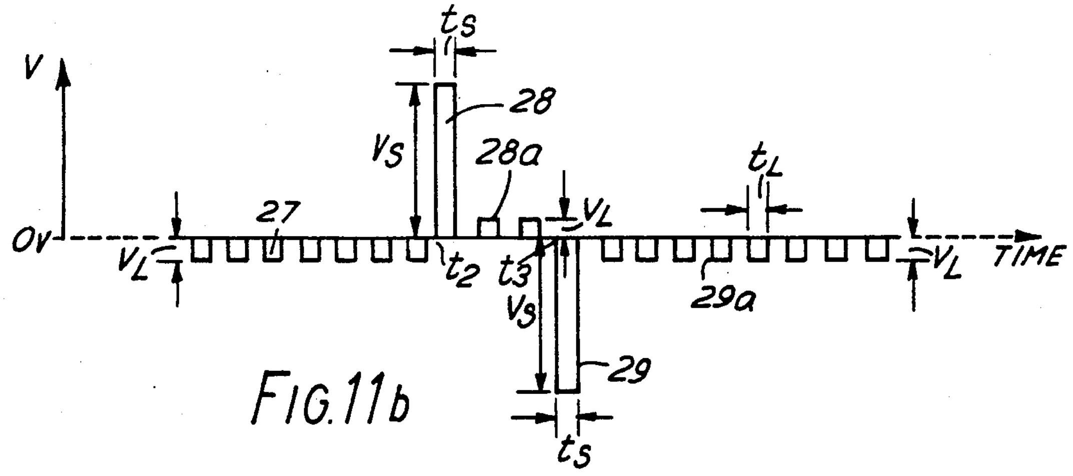

One application of an optical shutter with a mark-to-space ratio not equal to one is in a high-speed camera shutter. As the state of minimum optical transmission (non-transmissive or dark state) of a ferroelectric liquid crystal still allows some light to be transmitted, a mechanical camera shutter is used in combination with the liquid crystal optical shutter to prevent slow exposure of the photographic film. FIG. 11*a* shows the optical transmission $T_X$ of the liquid crystal optical shutter over time for an exposure of the film whilst FIG. 11*b* shows (not to the same time scale) the voltage waveforms used to produced this effect.

While the mechanical shutter is shut, the state of the liquid crystal optical shutter is not important and can be unspecified. Just prior to the opening of the mechanical shutter, the liquid crystal optical shutter is switched to the dark state $T_{X2}$. When the mechanical shutter is opened at time $t_1$, the liquid crystal optical shutter is being maintained in the dark state $T_{X2}$ by latching pulses 27, pulse height $V_L$, pulse width $t_L$ of one polarity. At the time $t_2$, a switching pulse 28 of the other polarity is applied to switch the liquid crystal optical shutter into the state $T_{X1}$ of maximum transmission (light state) and so expose the film. During the exposure time, latching pulses 28*a* of the same polarity as the switching pulse may be applied, if necessary (as shown) to maintain the shutter in the $T_{X1}$ state. At the end of the exposure, time $t_3$, the liquid crystal optical shutter is switched back to the dark state $T_{X2}$ by a switching pulse 29 and latching pulses 29*a* are applied to maintain the liquid crystal optical shutter in the dark state until the mechanical shutter is closed at time $t_4$. The voltage applied to the liquid crystal optical shutter can then be removed. The exposure time ($t_3$-$t_4$) will depend upon the switching speed of the liquid crystal, the light transmitted through the liquid crystal optical shutter and the speed of the film.

Using commercial available high speed photographic film, acceptable results were achieved with such a camera shutter system using the liquid crystal mixture SCE13 at 25° C. in a 1.5 μm thick cell with an exposure time ($t_3$-$t_2$) of 20 μs and a total dark stage ($t_4$-$t_1$) of 20ms. In this respect, it is to be noted that the waveform applied to the liquid crystal material for the camera system is a 'single-shot' waveform, i.e. the waveform is not being continually repeated or cycled. Accordingly, a mark-to-space ratio well in excess of the previously mentioned 10:1 (1000:1 in this example) is permitted as any cell alignment degradation due to DC electrolytic effects will occur over a considerably longer time scale than the shutter time of a high speed camera. The contrast ratio of the liquid crystal optical shutter, the light transmitted by the liquid crystal in the dark state and the speed of the film will limit the maximum mark-to-space ratio.

Figure 12:
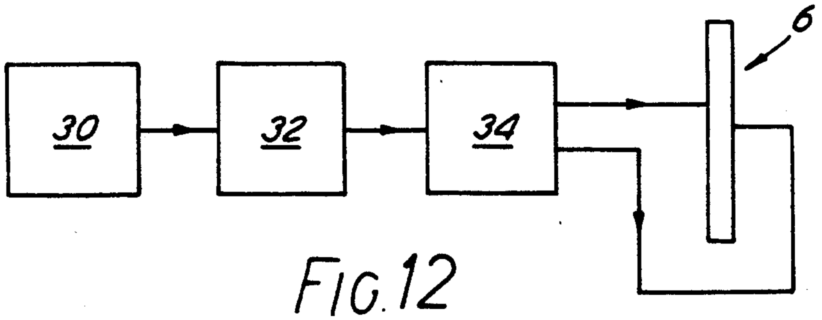
FIG. 12 shows schematically a circuit for addressing the shutter of FIG. 5 by a addressing scheme provided in accordance with the present invention.

A suitable circuit for generating waveforms to address the shutter of FIG. 5 is shown schematically in FIG. 12. The required waveform is generated by a computer programme loaded into a computer 30 (e.g. a Hewlett-Packard 9000/300) which determines the relative pulse heights at each of a number of time slots of the waveform produced by an arbitrary waveform generator 32 (eg a Wavetek Model 275 12MHz programmeable arbitrary function generator). The arbitrary waveform generator 32 is able to generate voltages in the range ±10V. The output of the arbitrary waveform generator 32 is fed to a voltage amplifier 34, capable of generating voltages in the range 35 80V, to generate the required waveform across the ferroelectric liquid crystal cell 6.

A variety of modifications of the embodiments described herein and within the scope of the present invention will be apparent to those skilled in the art.

I claim:

1. A method of controlling the transmission of electromagnetic radiation through a ferroelectric liquid crystal shutter comprising at least one liquid crystal cell having a first state of maximum transmission and a second state of minimum transmission, the cell being switchable between the first and second states by the application of a switching pulse having a value of voltage pulse width and voltage pulse height which, in combination, are sufficient to switch the cell, the method comprising applying a first switching pulse of one polarity to switch the cell to one of the first or second states and then applying a first plurality of consecutive controlling pulses of the same polarity as that of said first switching pulse for a time period greater than the pulse width of said first switching pulse, each controlling pulse having a pulse height and pulse width which, in combination, are insufficient to switch the cell between the two states, the controlling pulses serving to control the transmission of the cell in said one of the first and second states by counteracting any relaxation of the cell in said one of the first and second states.

2. A method according to claim 1 further comprising applying a further plurality of consecutive controlling pulses, the further plurality of controlling pulses being of opposite polarity to the first plurality of controlling pulses for controlling the transmission of the cell between said one of the first and second states and the other of said one of the first and second states.

3. A method according to claim 1 comprising applying a further switching pulse, of opposite polarity to the first switching pulse, followed by a plurality of consecutive controlling pulses of the same polarity as the further switching pulse.

4. A method according to claim 2 comprising applying a further switching pulse, of opposite polarity to the first switching pulse, after the further plurality of consecutive controlling pulses, the further switching pulse being followed by a plurality of consecutive controlling pulses of the same polarity as the further switching pulse.

5. A method according to claim 2 wherein the first and further pluralities of controlling pulses are applied to the cell for a substantially equal period of time.

6. A method according to claim 1 wherein the first plurality of controlling pulses have a pulse width substantially equal to the pulse width of the first switching pulse.

7. A method according to claim 2 wherein the further plurality of controlling pulses have a pulse width substantially equal to the pulse width of the first switching pulse.

8. A method according to claim 1 wherein the first plurality of controlling pulses have a mark space ratio 1:1.

9. A method according to claim 2 wherein the further plurality of controlling pulses have a mark space ratio of 1:1.

* * * * *